(12) United States Patent
Montgomery et al.

(10) Patent No.: US 8,353,617 B2
(45) Date of Patent: Jan. 15, 2013

(54) BACKLIGHT

(75) Inventors: David James Montgomery, Oxfordshire (GB); Ioannis Papakonstantinou, London (GB); Jonathan Mather, Oxford (GB); Meelis Lootus, Pärnu (EE)

(73) Assignee: Sharp Kabushiki Kaisha, Osaka (JP)

( * ) Notice: Subject to any disclaimer, the term of this patent is extended or adjusted under 35 U.S.C. 154(b) by 672 days.

(21) Appl. No.: 12/553,460

(22) Filed: Sep. 3, 2009

(65) Prior Publication Data

US 2011/0051460 A1    Mar. 3, 2011

(51) Int. Cl.
*F21V 33/00* (2006.01)
(52) U.S. Cl. .................................... 362/626; 362/620
(58) Field of Classification Search .................. 362/623, 362/617, 620, 626
See application file for complete search history.

(56) References Cited

U.S. PATENT DOCUMENTS

| | | | |
|---|---|---|---|
| 6,570,710 | B1 | 5/2003 | Nilsen et al. |
| 6,786,613 | B2 | 9/2004 | Suzuki |
| 7,128,443 | B2 | 10/2006 | Marra et al. |
| 7,286,280 | B2 | 10/2007 | Whitehead et al. |
| 2009/0047486 | A1* | 2/2009 | Jones et al. ................... 428/206 |
| 2009/0103008 | A1* | 4/2009 | Nasu et al. ..................... 349/64 |
| 2009/0195729 | A1* | 8/2009 | Little et al. .................... 349/64 |

* cited by examiner

*Primary Examiner* — Laura Tso
(74) *Attorney, Agent, or Firm* — Renner, Otto, Boisselle & Sklar, LLP

(57) ABSTRACT

A backlight is provided for illuminating an at least partially transmissive display. The backlight includes a light source. A light guide receives the light from an edge surface and guides the light by total internal reflection. The light extracted from the lightguide has an angular emission profile such that when incident on a prism film, collimated light is produced.

20 Claims, 9 Drawing Sheets

Figure 1: Conventional Art

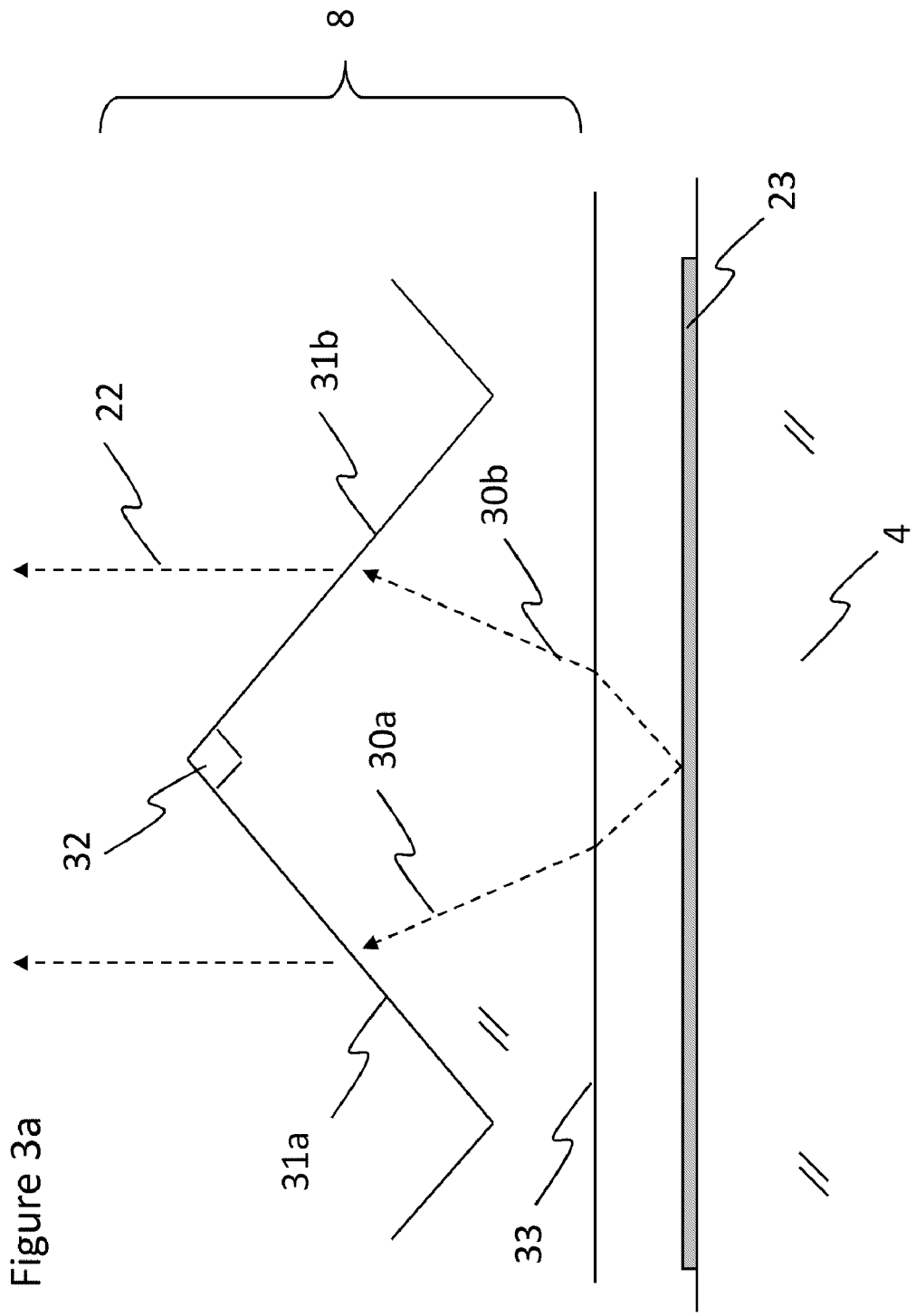

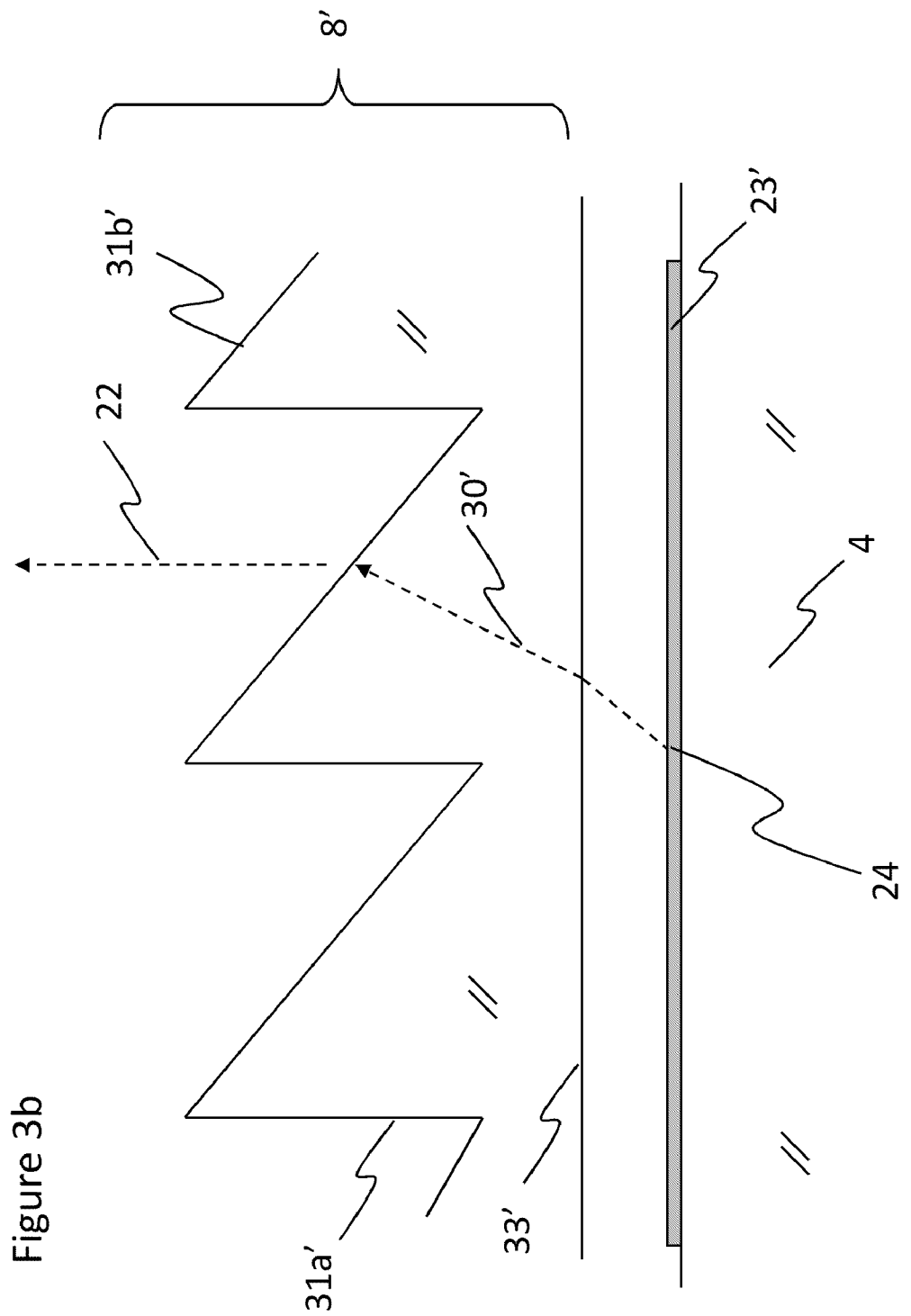

BACKLIGHT

TECHNICAL FIELD

The present invention relates to a backlight, for example for use with an at least partially transmissive spatial light modulator. The present invention also relates to a display including such a backlight. Moreover, the present invention relates to a distributed illumination panel including such a backlight that may be used for general illumination.

BACKGROUND OF THE INVENTION

FIG. 1 of the accompanying drawings illustrates the stack structure of a typical liquid crystal display (LCD) module of small size, for example for a mobile phone or PDA device. The display 1 includes a flat transmissive spatial light modulator (SLM) in the form of an LCD panel having input and output polarisers 12 on its bottom and top sides. The rest of the structure is generally regarded as the backlight system, as follows. A light source (for example an LED or Laser) emits light, which is coupled into a light guide and distributed across the back of the display by way of total internal reflection (TIR) in such a way that if no scattering structures were present the light would travel until it reached the end of the light guide. Within the light guide there are multiple scattering structures that extract the light from the light guide to illuminate the LCD panel by disrupting the TIR conditions at the surface of the light guide on which they are located, hence allowing the light to pass through the air light guide interface. These scattering features may be located on either the top or bottom major light guide surfaces. The density of the light scattering features may increase with distance from the light source to maintain a uniform rate of extraction of the light along the length of the light guide. As light is extracted both down and up from the light guide, a reflecting film is placed beneath the light guide to improve the efficiency of the backlight. There are also some optical films between the light guide and the LCD panel, placed to give better illumination uniformity over the display area and to enhance brightness within a given viewing angle range. These films typically consist of diffuser layers and prism films that enhance the central brightness of the backlight.

The prism films typically consist of lenticular lines of triangular cross section on a thin sheet. The triangle cross section is typically an isosceles right angle triangle with the right angle on the apex of the cross section. Two orthogonal prism films between diffusers are typically used in a backlight.

The operation of this prism film is to collimate and recycle light back to the reflector. Light that reaches the prism film at a high angle in a direction substantially perpendicular to the prism lines is reflected closer to the normal. Light at lower angles is reflected by total internal reflection (TIR) back though the diffuser and lightguide to the reflector and reflected back more diffuse, to the prism sheets. The result is an improvement in central brightness of the backlight by redistribution of light from high angle into the center.

There is also an interest in collimated backlights, where the light is distributed about the normal to the backlight and has a significant percentage between 5 and 10 degrees or less to this normal. Collimated light of this form is useful in improving the efficiency of liquid crystal displays. The operation of simple prism films is insufficient to give this level of collimation on their own.

This collimation can be achieved through control of the extraction features. The typical form of extraction features involves "roughening" of the surface in some manner to disrupt total internal reflection (TIR) in the lightguide. The extraction in this case produces light that is emitted at a high angle to the lightguide normal.

There are many types of extraction features that can control the angle of extraction, for example U.S. Pat. No. 6,786,613 (Minebea) describes wedge shaped extraction features that extract light in a more vertical direction.

Light extracted in a relatively collimated manner cannot be used with prism films because such light is recycled and the operation of these prism films serves to reduce the collimation angle and reduce the overall light throughput.

Other known methods of improving brightness and collimation are described below.

U.S. Pat. No. 7,286,280 (The University of British Columbia) describes a film with prismatic structures with rounded edges that can be deposited over brightness enhancement films (BEFs) to further enhance brightness gain while maintaining large viewing angle.

U.S. Pat. No. 6,570,710 (Reflexite Corporation) describes a dual side BEF film. A prismatic BEF like structure is formed on the top of the film while a sub-wavelength moth-eye shaped grating is formed on the bottom of the film. The grooves of the moth-eye grating are aligned vertically to the prism of the BEFs eliminating the chromatic non-uniformities at large viewing angles that BEFs usually exhibit.

U.S. Pat. No. 7,128,443 (Philips Electronics) describes a BEF supporting film with reflecting walls formed on its top surface. The slope of the walls is adjustable with respect to the film normal which has an effect to the cone of light that reaches the BEFs and so to the collimation of light. In this way the central brightness and the viewing angle of the display can be tuned.

SUMMARY OF THE INVENTION

According to an aspect of the invention, a lightguide is provided for use in distributing light received from a light source. The lightguide exists as part of a backlight assembly for a spatial light modular operating on a polarization basis. For example this could be a liquid crystal display (LCD). The backlight unit can include a reflecting assembly 5 on the opposite face from the LCD and not in contact with the lightguide. The light source may be illuminating another face of the lightguide that may be much smaller in area than the first two faces. A substantial part of the light is transmitted by total internal reflection across the lightguide. The lightguide includes at least one layer in substantial optical contact with adjacent layers. At least one face or interface between layers includes a structure that, when combined, emits light at one or more preferential directions away from the normal so that when the light interacts with a prism film layer above the lightguide, the light is efficiently turned towards the normal.

This invention may have the light emitted localized in two or more angles that are in two perpendicular directions which are aligned to substantially crossed prism film structures.

The structures that out-couple light may be sub-wavelength structures that can be, but not limited to, lenticular or two dimensional grating structures.

The structures may be in one layer of a lightguide that can be made up of more than one horizontal layers, in which one layer only (or a number of layers less than or equal to the total), other than the layer containing the diffractive structures, is illuminated by a light source.

The lightguide could be transmitting white light or a substantially single wavelength.

The BEF structure can be dispersive to improve the collimation angle with a white light source.

The structures may be non-diffractive features such as lenticular or 2D arrayed rectangular structures that preferentially emit in these above mentioned preferential directions.

The above features can be used with BEF features with an apex angle that differs from 90° or with non-straight sides in order to optimize the system.

The above mentioned structures may be modified in size or feature density to obtain a uniform output.

According to an aspect of the invention, a backlight system is provided. The backlight system includes a lightguide for transferring light by total internal reflection and at least one prism layer having an array of prism structures. In addition, the backlight system includes an extraction feature structure for extracting light from a face of the lightguide towards the at least one prism layer in one or more preferential directions which are away from normal to the lightguide, wherein each of the one or more preferential directions is specific to a corresponding acceptance angle of the prism structures to produce collimated emission of the extracted light from the at least one prism layer.

In accordance with another aspect, the extraction feature structure includes sub-wavelength extraction features.

According to another aspect, the extraction feature structure includes at least one of a lenticular grating structure or a two-dimensional grating structure.

In accordance with yet another aspect, the extraction feature structure is formed on a surface of the lightguide.

According to still another aspect, the lightguide includes a plurality of adjacent layers in optical contact, and the extraction feature structure is formed at least at one face or interface of the plurality of adjacent layers.

According to another aspect, light is introduced into the light guide only by way of one or more of the plurality of adjacent layers other than the layer or layers forming the extraction feature structure.

In accordance with another aspect, the prism structures have an apex angle substantially equal to 90°.

According to still another aspect, the prism structures have an apex angle not substantially equal to 90°.

According to another aspect, the one or more preferential directions consists of a single preferential direction.

In accordance with yet another aspect, the one or more preferential directions consists of a plurality of preferential directions.

According to another aspect, the at least one prism layer includes a plurality of prism layers with substantially crossed prism structures, and the one or more preferential directions includes perpendicular preferential directions respectively aligned to the substantially crossed prism structures.

In still another aspect, the light is composed of a plurality or a continuum of wavelengths and the at least one prism layer is dispersive to improve collimation of the extracted light.

In accordance with another aspect, the light is substantially a single wavelength.

According to another aspect, the extraction feature structure includes non-diffractive features including at least one of a lenticular arrayed rectangular structure or a two-dimensional arranged rectangular structure.

According to another aspect, at least one of a density, size or shape of extraction features within the extraction feature structure varies with position along the lightguide to increase uniformity in the emission of the extracted light from the lightguide.

In accordance with another aspect, the direction of the collimated emission is normal to the at least one prism layer.

According to still another aspect, the direction of the collimated emission is not normal to the at least one prism layer.

In still another aspect, the extraction feature structure is positioned on at least one of the face of the lightguide from which the light is extracted or a face of the lightguide opposite the face from which the light is extracted.

According to another aspect, the backlight system further includes a light source for illuminating another face of the lightguide According to another aspect of the invention, a display is provided which includes an at least partially transmissive spatial light modulator; and a backlight system as described herein.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3a illustrates the operation of the $1^{st}$ embodiment with two emission directions;

FIG. 3b illustrates the operation of the $1^{st}$ embodiment with one emission direction;

DETAILED DESCRIPTION OF THE INVENTION

Figure 1:
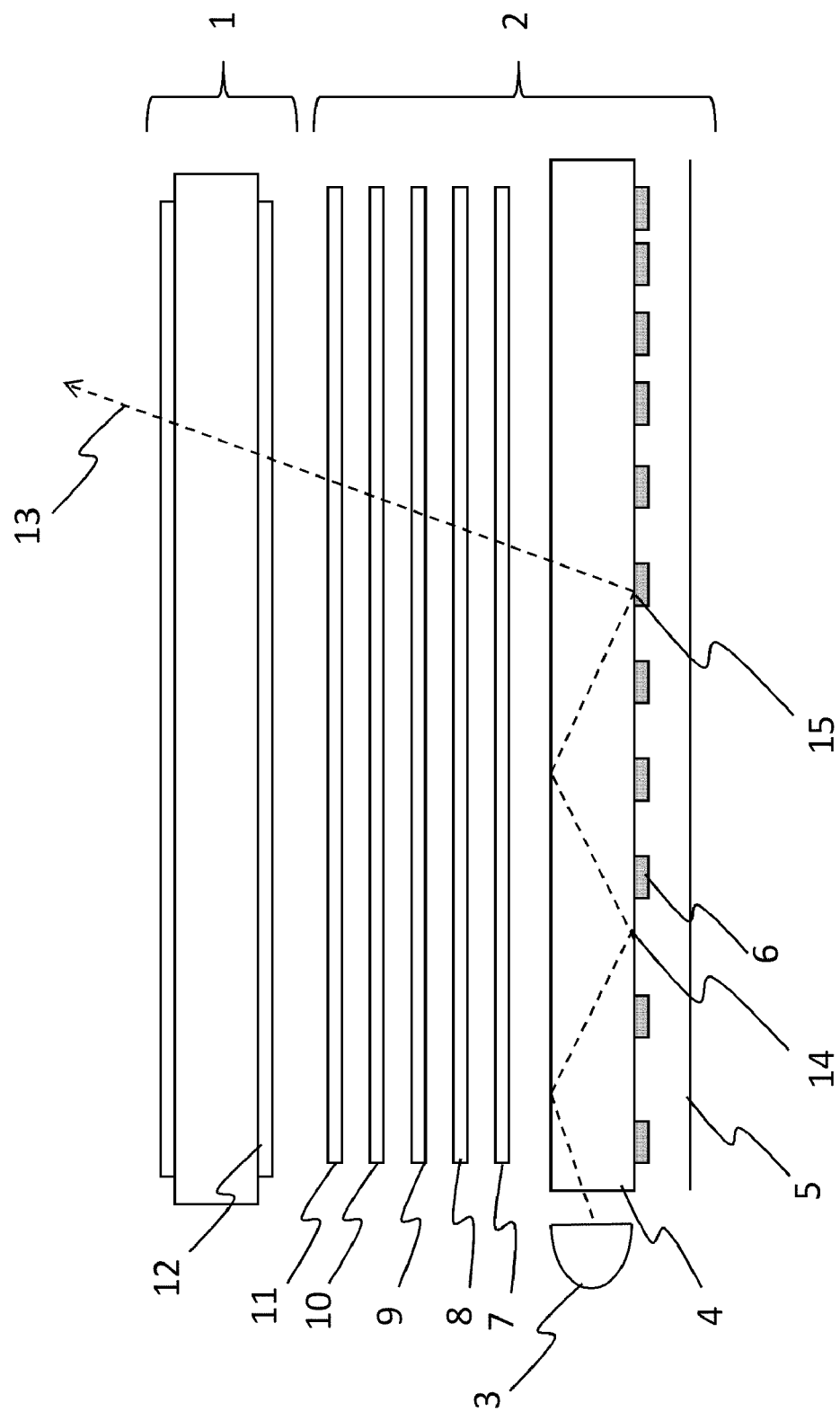
FIG. 1 illustrates a typical backlight of known type.

The present invention will now be described in detail with reference to the drawings, in which like reference numerals are used to refer to like elements throughout.

FIG. 1 illustrates a typical small area liquid crystal display that is well known in the art. The display includes a liquid crystal display panel 1 and a backlight unit 2. The backlight unit 2 includes a number of components relevant to discuss here. A white light source 3, that can be a fluorescent tube, an LED with phosphor, an RGB LED group, a laser or other light source, is positioned to inject light into the edge of a thin lightguide 4. The lightguide is designed to transfer by total internal reflection (TIR) 14 the light across the area of the display. At least one large or major face, which can be the top, bottom (illustrated) or both major faces, has features 6 that disrupt the TIR 15 in the lightguide so that the light 13 leaves the lightguide 4. The light that leaves the lightguide 4 generally has the wrong angular brightness characteristics for the display, so four additional layers, a strong diffuser 7, two crossed prism sheets 8 and 9 in orthogonal directions and a weak diffuser 10 are used to produce the correct angular distribution. In many cases the weak diffuser 10 is incorporated into the top prism layer 9. A further layer 11 can be an optional polarization conversion film, which is typically an interference film that reflects one polarization and transmits the other.

The prism films 8 and 9 are brightness enhancement films (BEFs) and typically include identical lenticular lines of repeating triangular cross section. The apex of the prisms is typically 90° and the lenticular lines in the two sheets are arranged orthogonally one above the other.

The operation of these films 8 and 9 involves the concentration of off-axis light towards the central axis by refraction from the prism faces. On-axis light is reflected by total internal reflection from the two perpendicular sides of the prism and is recycled back through the lightguide system. The result is an increased collimation and a higher central brightness to the system.

Figure 2:
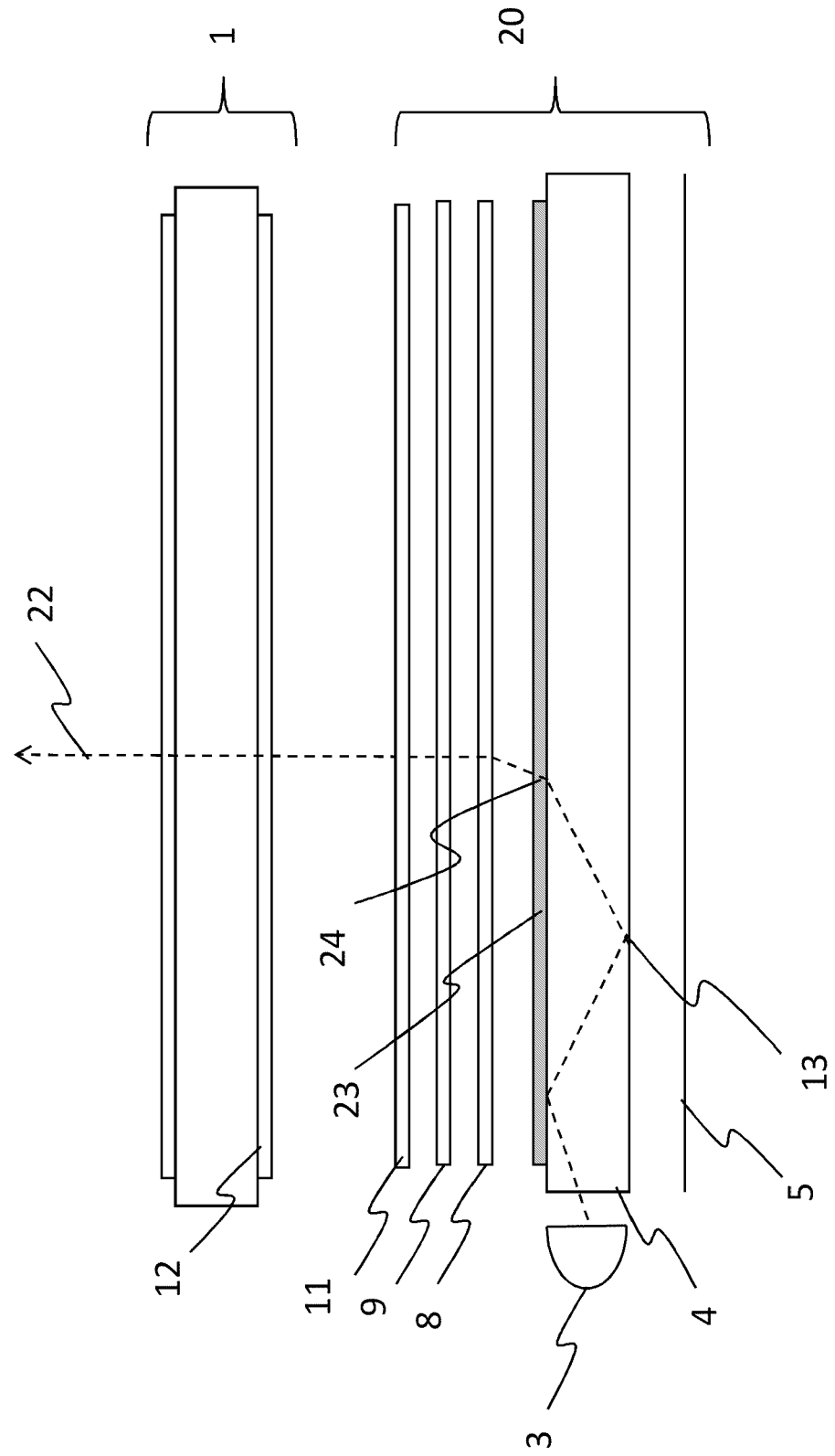
FIG. 2 illustrates an overview of an exemplary $1^{st}$ embodiment of the present invention.

An overview of an exemplary embodiment of the present invention is shown in FIG. 2.

The exemplary embodiment includes a backlight 20 that will be described in reference to the conventional backlight 2 of FIG. 1 and the relevant changes only will be described here.

The embodiment includes a liquid crystal spatial light modulator (SLM) 1 and a backlight 20. The backlight 20 includes a light source 3, a lightguide 4, and a reflector 5. Two sheets, a weak diffuser (not illustrated) and a polarization conversion film 11, are individually possible but not required in this arrangement. The lightguide 4 has extraction features 23 forming an extraction feature structure that can be positioned on one or both faces of the lightguide 4. In this example, these extraction features 23 are on the top surface.

Light 22 in the lightguide 4 is transmitted to the extraction features 23 by TIR 13 and extracted at 24 by the extraction features 23 in one or more preferential directions as determined by the direction(s) of the main diffractive order(s) of the extracted light.

FIG. 3a shows a detail of the embodiment in FIG. 2 that shows one of the prism sheets, namely prism sheet 8. The prism sheet 8 has an apex angle 32 substantially equal to 90° and two identical lenticular sides 31a and 31b. Light extracted from the extraction features 23, once refracted by the prism film's lower surface 33 not in optical contact with the lightguide, 4, or extraction features 23, is substantially directed at two oblique angles 30a and 30b, which, when respectively interacting with the two sloping lenticular sides 31a and 32b of the prism sheet 8, is directed vertically as 22.

FIG. 3b shows an alternative arrangement for the prism sheet layer, in this case designated 8'. The prism sheet layer 8' has a triangular arrangement having a lower surface 33' as illustrated in which there is only one sloping side 31b' and the other side 31a' is at an angle which is not important and could be vertical. In this case the extraction features 23' emit light 30' substantially at one angle that, when it interacts with the sloping side 31b' is directed substantially vertically as 22.

The extraction features 23, 23' and the prism sheets 8, 8' need not be aligned with each other.

The second prism sheet 9 shows an identical performance in the orthogonal plane normal to the lightguide 4.

The collimated light direction may not be the normal to the prism sheet but may be in another defined direction.

Figure 4:
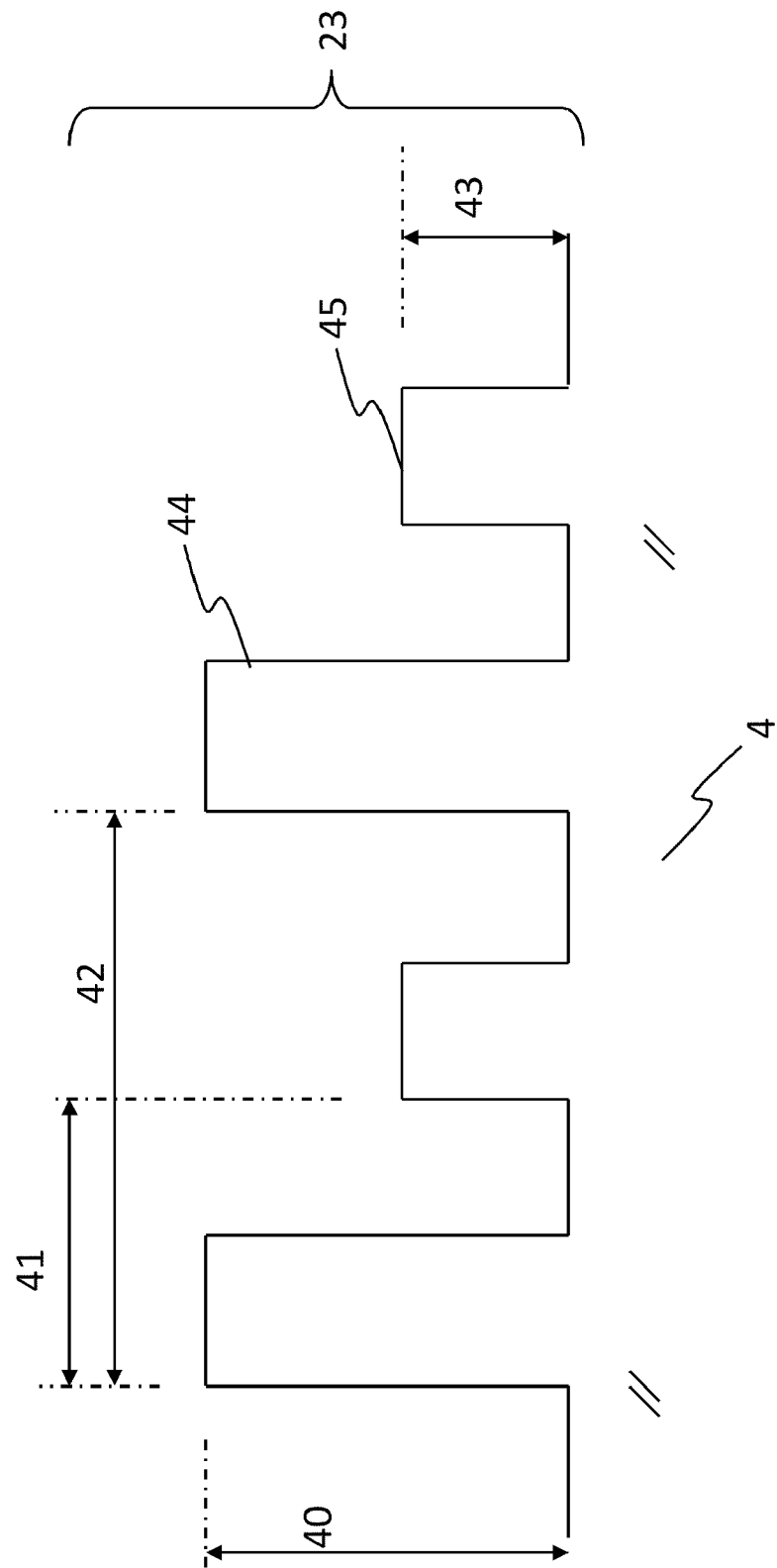
FIG. 4 illustrates the detail of an exemplary diffractive layer of the $1^{st}$ embodiment.

One possible form the extraction features 23 or 23' is shown in FIG. 4. The extraction features 23, 23' are made up of a composite lenticular grating the cross section of which is shown in FIG. 4. The grating is arranged on the surface of the lightguide 4 so that the intensity of light emitted from the lightguide 4 is substantially the same over the display. This can be achieved by arranging the diffractive features of the composite into areas whose density or sizes alter with position on the lightguide. For example, the feature cross section may be a square grating with alternate grating structures 44 that may be higher than interleaved grating structures 45 making up the composite grating. The structures 44 and 45 instead may be the same height, i.e. height 40 is equal to the height 43.

One potential design structure can be where the pitch 42 of the tall features 44 can be 508 nm, and distance 41 between the tall 44 and short 45 features is 254 nm. The short features have a height 43 of 145 nm, and the tall features have a height 40 equal to that of the short features, 145 nm or twice that, 290 nm. This is for an illuminating wavelength of 450 nm in a material of refractive index approximately 1.58.

This grating, when incident with light from a range of angles and polarizations that are typical in a light illuminated lightguide, emits light in the main diffractive order(s) that are specific to the acceptance angles of the typical prism sheet 8, thus resulting in a collimated emission.

In order to create collimation in two dimensions, the pattern of FIG. 4 is repeated in the second direction creating a two-dimensional square grating. A set of crossed prisms structures 8 and 9 can then be used to create collimation in a second direction.

Figure 5:
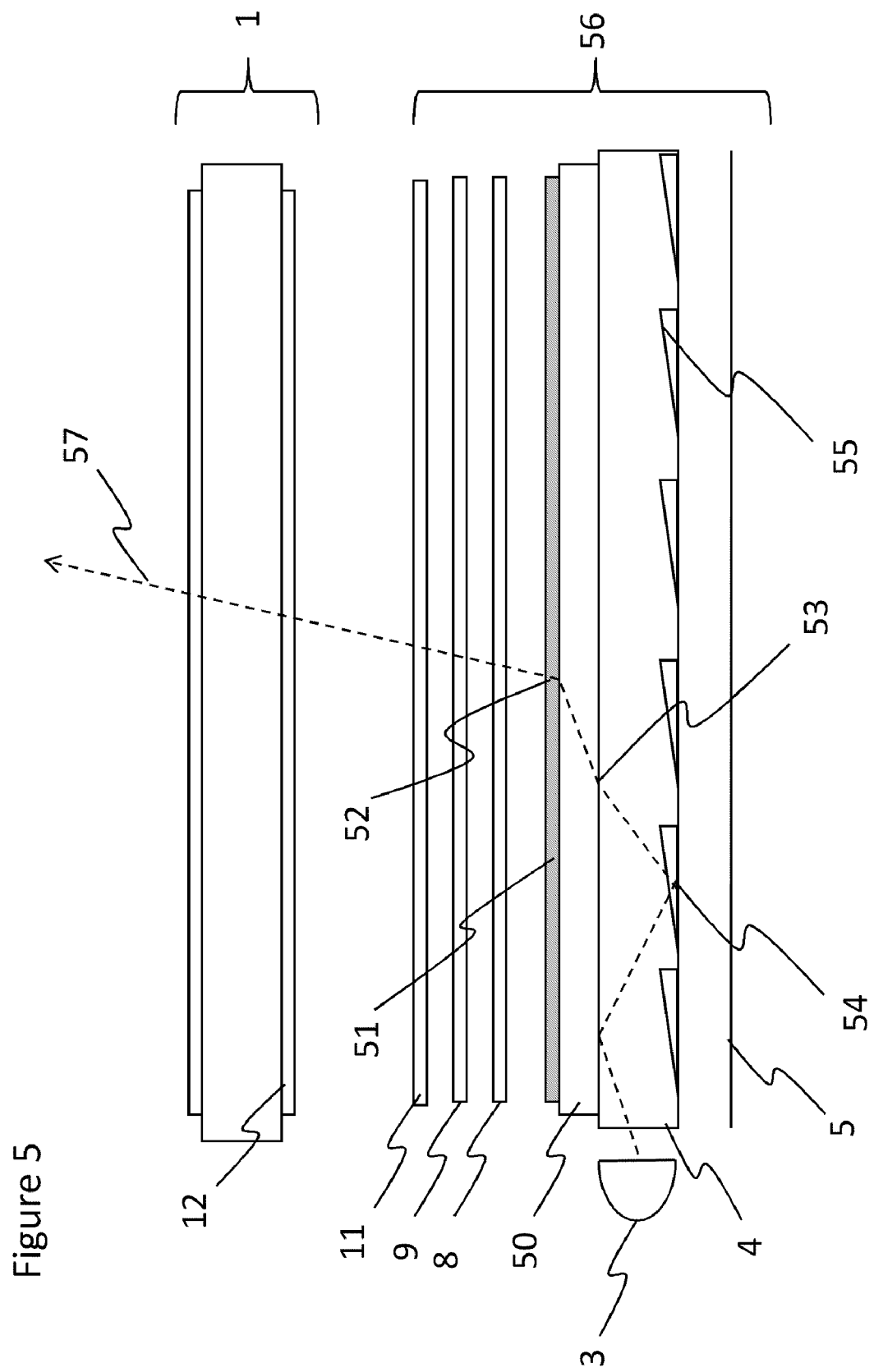
FIG. 5 illustrates a $2^{nd}$ embodiment of the present invention with a multiple layered lightguide.

Another embodiment of the invention is shown in FIG. 5. Only the relevant differences between this embodiment and the embodiment of FIG. 2 are described herein for sake of brevity.

In this embodiment the backlight 56 includes a lightguide 4 which has a second lightguide layer 50, in which the refractive index of this layer 50 is less than that of the lightguide 4. Extraction features 51 similar to the extraction features 23 and 23' as described above are placed on the second lightguide layer 50. In this arrangement the range of angles in the second lightguide layer 50 is much reduced. This means the quality of the out-coupled light is significantly improved over the single-lightguide approach.

Extraction of light 52 from the main lightguide 4 into the secondary lightguide 50 can be controlled by appropriate non-diffractive features on the opposite face of the lightguide 4, for example shallow wedge shaped features 55 that direct a small proportion of the lightguide light 54 into the second layer at 53. The light 57 then exits the backlight in a collimated fashion.

The number of layers making up the lightguide 4 is not fixed, and the lower or both surfaces and/or any of the faces or interfaces can have one or more extraction arrangements.

Figure 6:
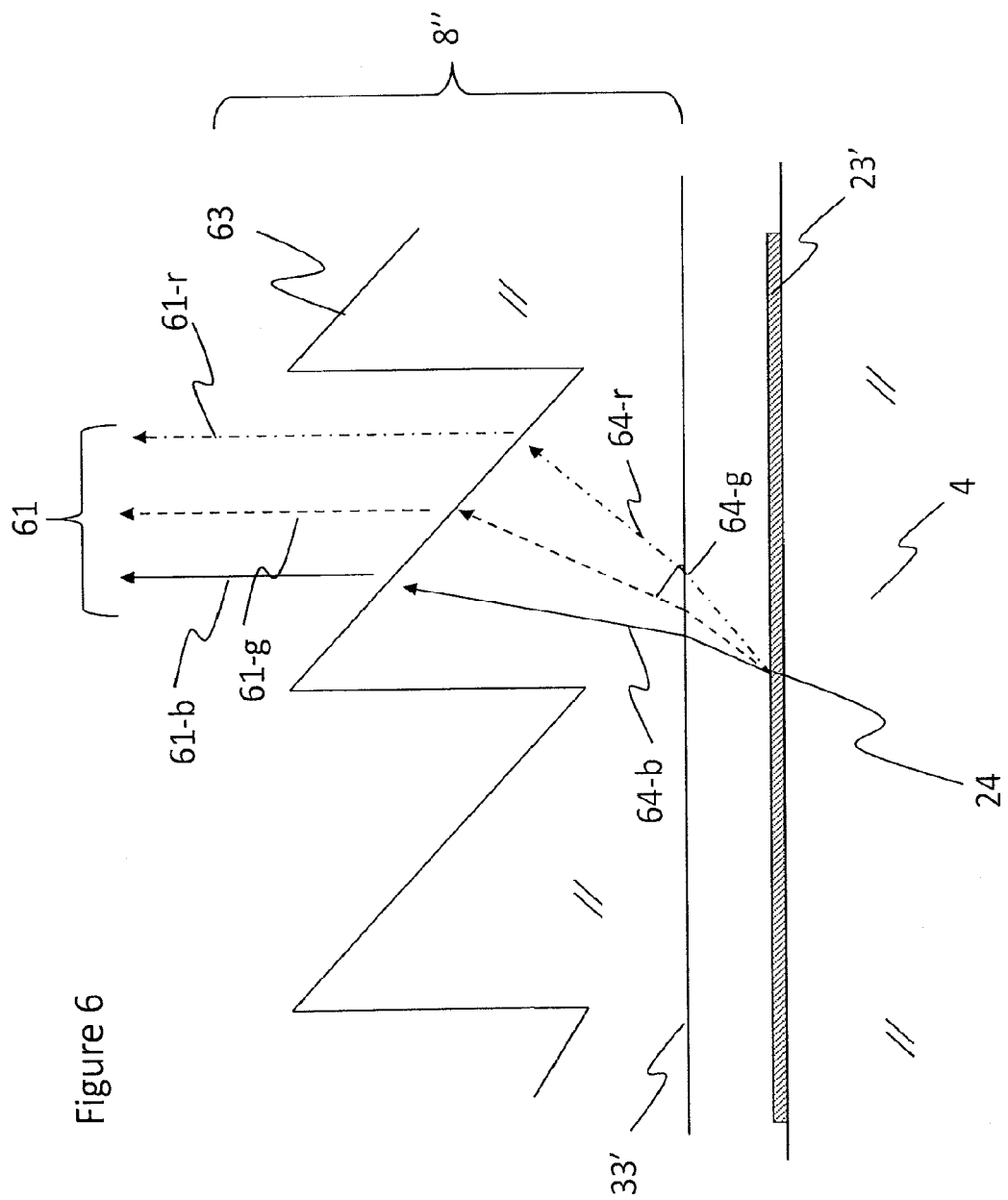
FIG. 6 illustrates a $3^{rd}$ embodiment of the present invention with a dispersive BEF.

In a further embodiment shown in FIG. 6, which includes a backlight where the light illuminating the lightguide 4 is not a single wavelength and can consist of more than one wavelength or a continuum. In the case illustrated, three wavelengths 64-r, 64-g, 64-b, are shown diffracting at 24 from the extraction features 23' on the surface of the lightguide 4. In this case the prism structure of layer 8" is illustrated as a single slope side 63 similar to that which is shown in FIG. 3b, but this can equally apply to the other embodiments in this invention. In the case illustrated, the longer wavelength beam 64-r is diffracted further from the normal, but the invention is not limited to this.

In this case the material of the prism structure 8" is dispersive such that the refractive index for the longer wavelength (64-r) is larger, so the refraction is stronger on the slope 63. The refractive index is proportionally less for each wavelength forming collimated light at each wavelength 61-*r*, 61-*g* and 61-*b* (represented collectively as 61).

In this embodiment the sloping side 63 also may not be a flat surface but can be a curved surface in addition.

Figure 7:
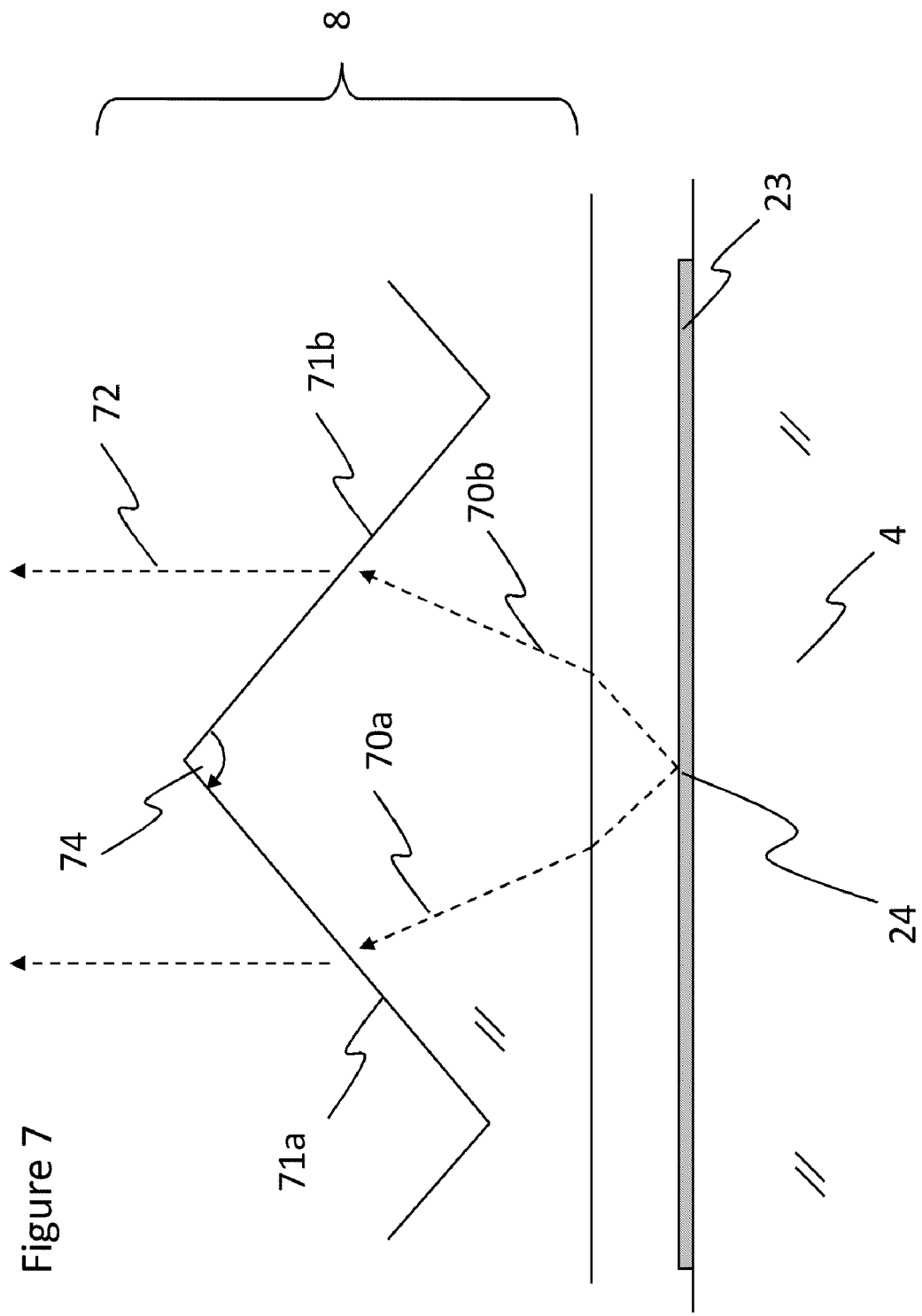
FIG. 7 illustrates a $4^{th}$ embodiment of the present invention with a modified BEF layer.

FIG. 7 illustrates another embodiment of the invention whereby the prism sheet 8 is altered with the extraction features 23 in order to optimize the extracted light direction 72. This invention illustrates the prism layer 8 according to the embodiment of FIG. 3*a* but can apply to any embodiment of this invention.

In this aspect the diffracted light 70*a* and 70*b* in incident on the sloping sides 71*a* and 71*b*, but in this case the apex angle 74 is not a right angle but some other angle.

Figure 8C:
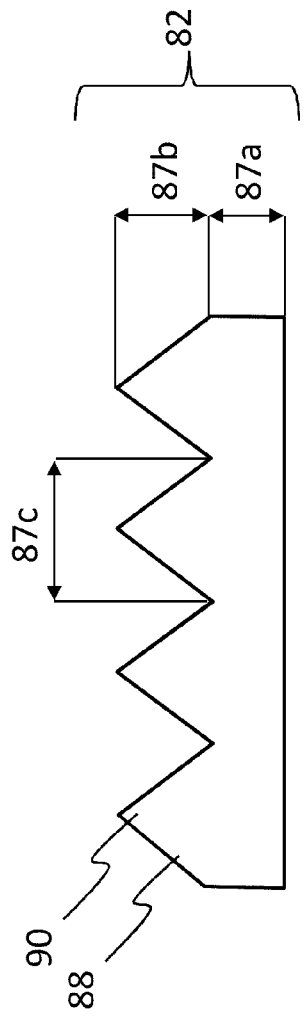
FIG. 8 illustrates a $5^{th}$ embodiment of the present invention with a macroscopic rectangular structure, where (a) illustrates the lightguide, (b) illustrates a cross section of the lower BEF structure, and (c) illustrates a cross section of the upper BEF structure.
Figure 8B:
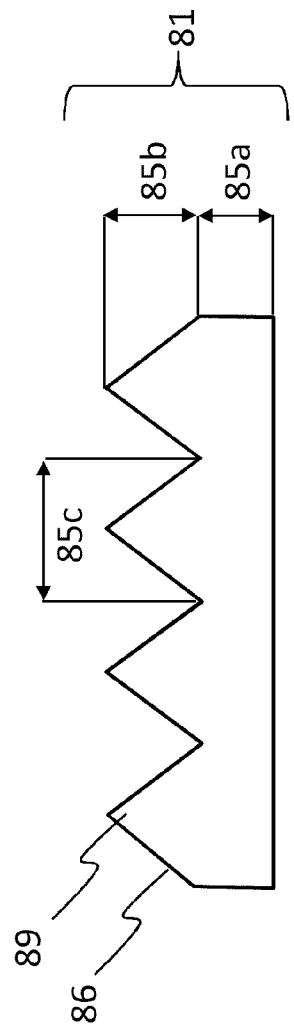
Figure 8A:
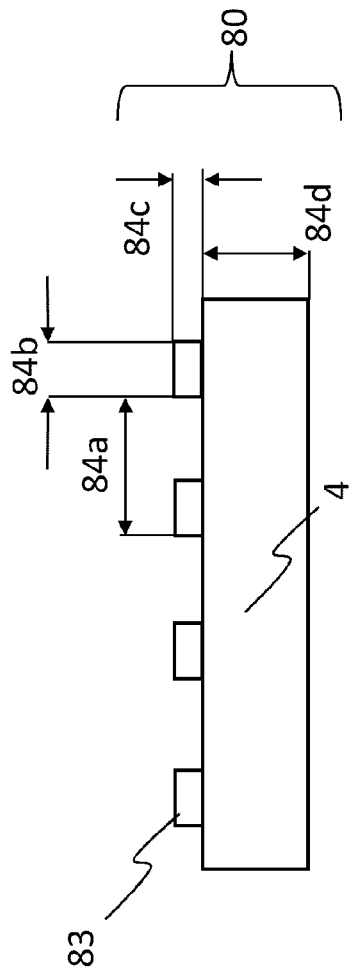

The three figures of FIG. 8 illustrate a further aspect to this invention. FIG. 8*a* shows a lightguide arrangement 80 with a lightguide 4 with extraction features 83 in the form of rectangular blocks that extend into the page. Light from the lightguide 4 is extracted from the blocks within a certain angular range. This angular range is predominantly in a particular direction. FIG. 8*b* illustrates a lower prism film 81 (e.g., prism film 8 in FIG. 2) having prism features 86. FIG. 8*c* illustrates an upper prism film 82 (e.g., prism film 9 in FIG. 2) having prism features 88, but in an orthogonal direction to the lower prism structure. The shape of the features in prism films 81 and 82 is defined in order to interact with the direction(s) of light emitted from the lightguide arrangement 80 so that the light emerging is substantially collimated.

This arrangement does not require diffractive features on the lightguide.

A typical arrangement involves the following values for the dimensions of the system which are given in relative units. The arrangement covered by this invention is not limited to these values.

In FIG. 8*a*, the pitch of the features, 84*a*, is 4 units, the width of the features, 84*b*, may be 1.2 units, the height 84*c* is 1 unit and the thickness of the lightguide 84*d* is 4 units.

In FIG. 8*b*, the pitch of the prism film 85*c* is 4 units, the height of the features 85*b* is 5.28 units and the thickness of the film 85*a* is 6.66 units. The apex angle 89 is 41.5°.

In FIG. 8*c*, the pitch of the prism film 87*c* is 4 units, the height of the features 87*b* is 5.52 units and the thickness of the film 87*a* is 6.66 units. The apex angle 90 is 39.8°.

An advantage of this backlight system over known backlight systems with non-diffractive lightguides is that very little light is scattered back from the prism films. In many designs light from the waveguide is extracted by scattering features which scatter light out of the waveguide in forward and backward directions. This light suffers multiple bounces within the backlight system which is inefficient, reducing the light output from the backlight. In the new embodiment nearly all the light is extracted in the forwards direction and bent on axis by the two prism films such that very little light suffers multiple bounces and scattering. Therefore the system may be more efficient.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A backlight system, comprising:
   a lightguide for transferring light by total internal reflection;
   at least one prism layer having an array of prism structures; and
   an extraction feature structure configured to extract light from a first face of the lightguide towards the at least one prism layer in one or more directions determined by directions of a main diffractive order of the extracted light, the one or more directions being at a non-zero angle with respect to normal of the first face, wherein each of the one or more directions is specific to a corresponding acceptance angle of the prism structures to produce collimated emission of the extracted light from the at least one prism layer.

2. The backlight system according to claim 1, wherein the extraction feature structure comprises sub-wavelength extraction features.

3. The backlight system according to claim 2, wherein the extraction feature structure comprises at least one of a lenticular grating structure or a two-dimensional grating structure.

4. The backlight system according to claim 1, wherein the extraction feature structure is formed on a surface of the lightguide.

5. The backlight system according to claim 1, wherein the lightguide comprises a plurality of adjacent layers in optical contact, and the extraction feature structure is formed at least at one face or interface of the plurality of adjacent layers.

6. The backlight system according to claim 5, wherein light is introduced into the light guide only by way of one or more of the plurality of adjacent layers other than the layer or layers forming the extraction feature structure.

7. The backlight system according to claim 1, wherein the prism structures have an apex angle substantially equal to 90°.

8. The backlight system according to claim 1, wherein the prism structures have an apex angle not substantially equal to 90°.

9. The backlight system according to claim 1, wherein the one or more directions consists of a single direction.

10. The backlight system according to claim 1, wherein the one or more directions consists of a plurality of directions.

11. The backlight system according to claim 1, wherein the at least one prism layer comprises a plurality of prism layers with substantially crossed prism structures, and the one or more directions comprise perpendicular directions respectively aligned to the substantially crossed prism structures.

12. The backlight system according to claim 1, wherein the light is composed of a plurality or a continuum of wavelengths and the at least one prism layer is dispersive to improve collimation of the extracted light.

13. The backlight system according to claim 1, wherein light is substantially a single wavelength.

14. The backlight system according to claim 1, wherein the extraction feature structure comprises non-diffractive features including at least one of a lenticular arrayed rectangular structure or a two-dimensional arranged rectangular structure.

15. The backlight system according to claim 1, wherein at least one of a density, size or shape of extraction features within the extraction feature structure varies with position along the lightguide to increase uniformity in the emission of the extracted light from the lightguide.

16. The backlight system according to claim 1, wherein the direction of the collimated emission is normal to the at least one prism layer.

17. The backlight system according to claim 1, wherein the direction of the collimated emission is not normal to the at least one prism layer.

18. The backlight system according to claim 1, wherein the extraction feature structure is positioned on at least one of the first face of the lightguide from which the light is extracted or a second face of the lightguide opposite the first face from which the light is extracted.

19. The backlight system according to claim 1, further comprising a light source for illuminating a second face of the lightguide.

20. A display, comprising:
an at least partially transmissive spatial light modulator; and
a backlight system according to claim 1 for lighting the spatial light modulator.

* * * * *